UNITED STATES PATENT OFFICE.

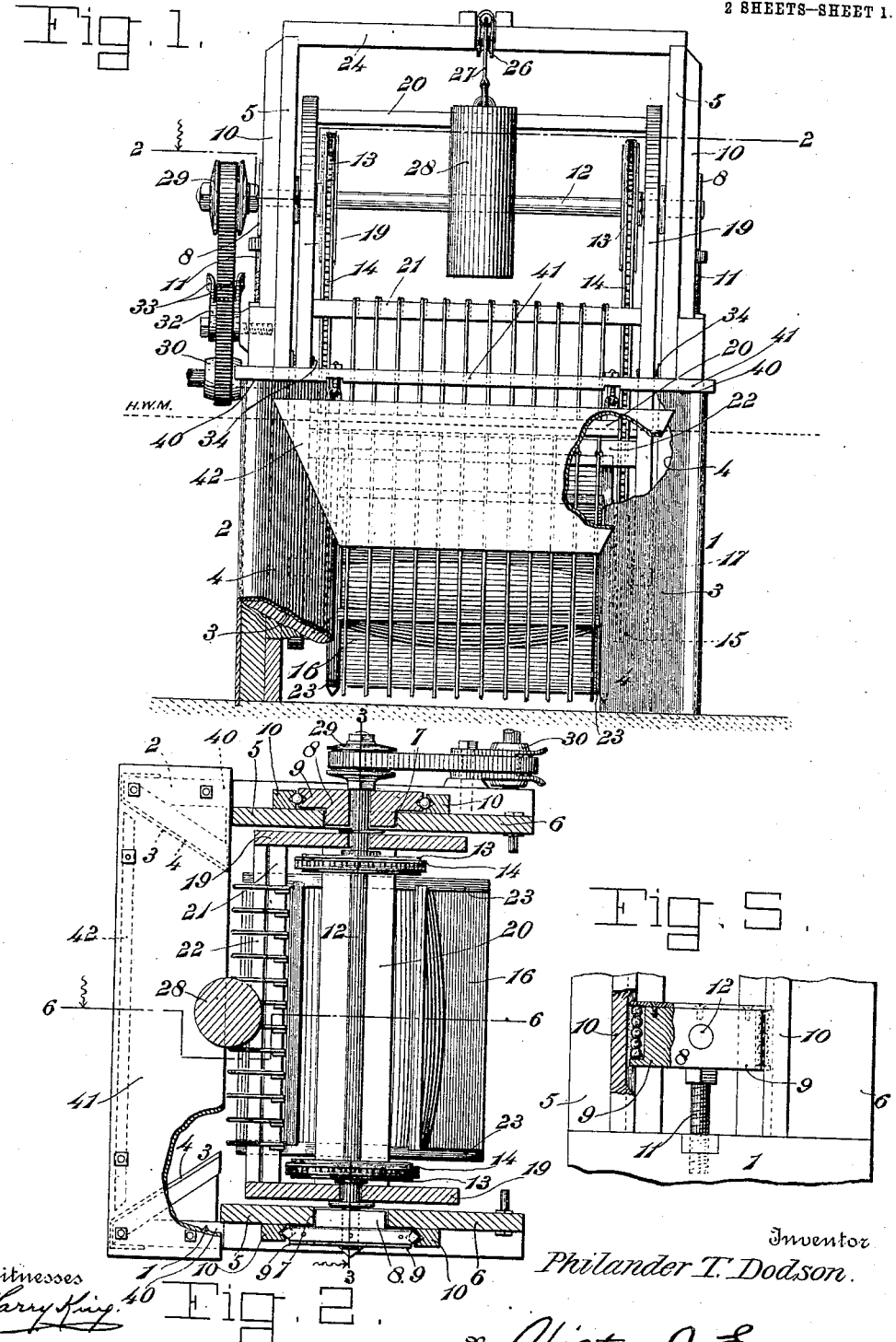

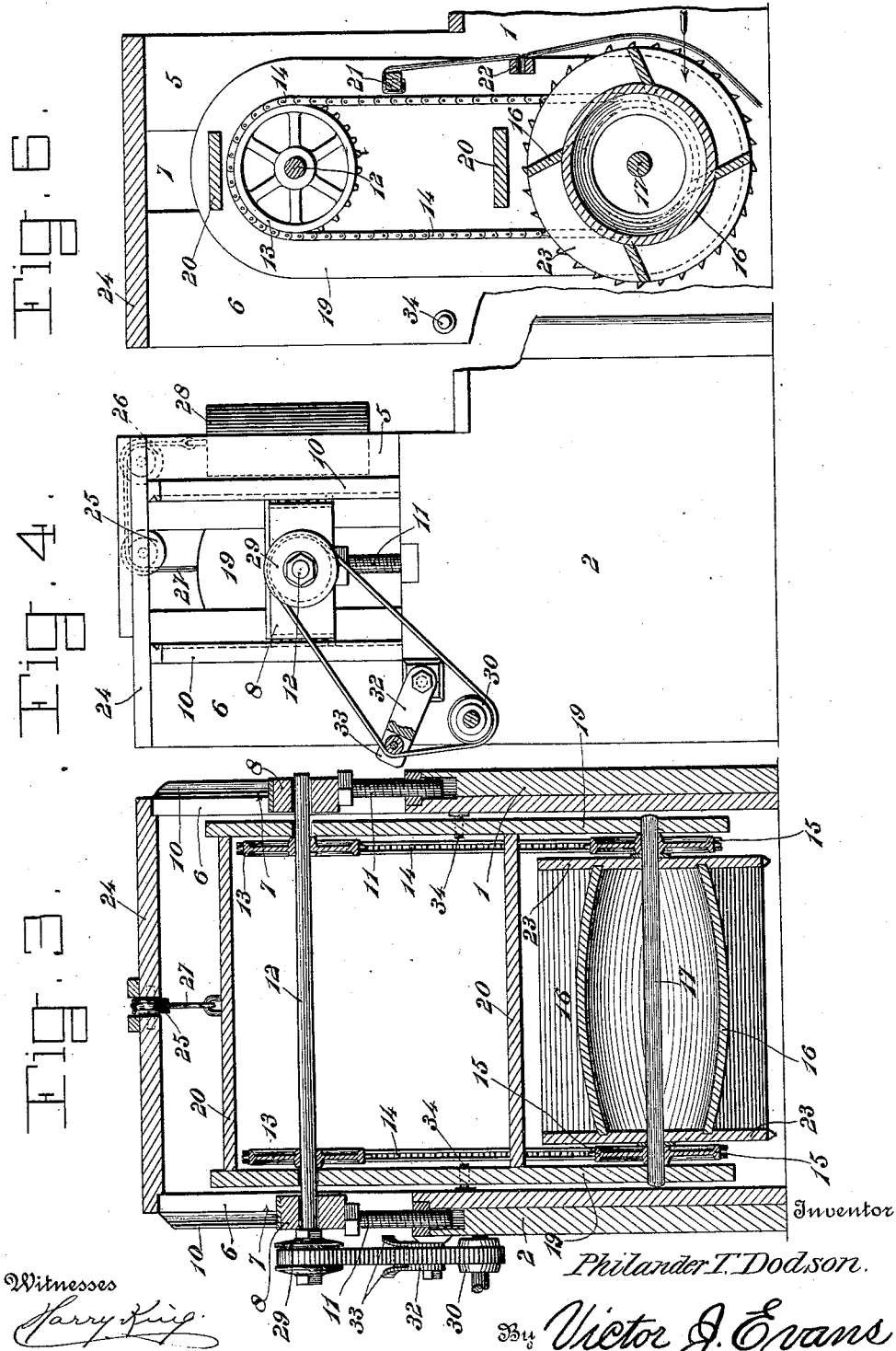

PHILANDER T. DODSON, OF CRESTON, IOWA.

BALANCED WATER-MOTOR.

988,256.

Specification of Letters Patent. Patented Mar. 28, 1911.

Application filed April 6, 1910. Serial No. 553,723.

*To all whom it may concern:*

Be it known that I, PHILANDER T. DODSON, a citizen of the United States, residing at Creston, in the county of Union and State of Iowa, have invented new and useful Improvements in Balanced Water-Motors, of which the following is a specification.

This invention relates to water motors.

The object of the invention is to provide a simple, cheaply constructed and efficient water motor which may be placed between the abutments or piers of a bridge or between the end abutments and one of the out stream piers.

A still further object of the invention is the provision of novel means for supporting the buoyant wheel upon the driving shaft and for balancing said wheel in such a manner as to take the strain or weight of the wheel off of the shaft whereby it may run practically free in its bearings.

A still further object of the invention is the provision of novel means for adjusting the elevation of the wheel hangers and for adjusting the tension of the driving belt in accordance therewith.

Further objects and advantages of the invention will appear as the following detailed specification is read in connection with the accompanying drawings, in which:—

Figure 1 is a front elevation of the device shown attached to an abutment and a bridge pier. Fig. 2 is a horizontal section on the line 2—2 of Fig. 1. Fig. 3 is a vertical section on the line 3—3 of Fig. 2. Fig. 4 is a side elevation showing the arrangement of bearing adjustment and the belt tightener. Fig. 5 is a fragmentary side elevation with parts broken away showing the ball bearing arrangement of the bearing blocks with the bearing guides, and Fig. 6 is a detail vertical transverse section on the line 6—6 of Fig. 2.

Referring more particularly to the drawing, 1 represents a bridge abutment and 2 a pier abutment both of which for the purposes of convenience will hereinafter be called supports. Each of these supports 1 and 2 is provided with a beveled face 3 which is covered with any suitable material such as armor plate 4 or the like for the protection of the supports and in order that the water may be guided directly to the wheel which will hereinafter be described. Rising from the supports are towers 5 and 6 which are separated so as to form a bearing slot 7 in which the bearings 8 are adapted to slide.

These bearings have a lateral extension 9 which is grooved at its ends to correspond with similar grooves in guide-ways 10 mounted upon the towers. These grooves are adapted to receive balls or other anti-friction devices whereby the movement of the bearings in the guides may be accomplished with ease. The bearings are supported in adjusted position by jack screws 11 which extend up from the supports and may be adjusted by any suitable wrench so as to raise or lower the bearings which will presently appear. Journaled in the bearings is the main shaft 12 which is provided adjacent its ends with sprocket wheels 13 over which the driving chains 14 are adapted to pass. These driving chains extend downwardly and are connected to sprocket wheels 15 upon the water wheel 16. This water wheel is hollow so as to have sufficient buoyancy to follow the rise and fall of the stream and is supported upon a shaft 17 journaled in the bottom of the wheel hangers 19.

The hangers 19 are pivotally mounted upon the shaft 12 and are provided with suitable cross braces 20 which hold them equidistant and prevent any lateral strain caused by the water rushing through the channel formed by the supports, from twisting them out of alinement on their bearings. A suitable guard work comprising horizontal bars 21 and 22 and vertically arranged spring fingers, is provided in order to prevent any debris or other material from coming in contact with the wheel. These guard fingers are so arranged as to cause such foreign material to travel beneath the wheel and the inner end of the plate fastenings of the supports overlap the edges of the wheels in such a manner that the chains 13 run in practically still water. As a further means of causing foreign material to pass underneath the wheel I provide spurs or other projections 23 on the rims of the wheel which act to force the material beneath said wheel.

Bridged across the top of the towers is a supporting platform 24 which is slotted to receive the pulleys 25 and 26, the former being arranged immediately over the upper brace 20 in order to take the weight cable 27 which is connected to said brace and passes over both pulleys 25 and 26 to a balance weight 28. This balance weight has a specific gravity equal to the weight of the hangers and wheel and thereby removes the friction from the drive shaft 12.

On the end of the drive shaft is secured a pulley 29 which is belted to a similar pulley 30 of the part to be driven. This latter pulley may be connected to the shaft of a dynamo or the like. In order to keep the belt which connects the pulleys in proper engagement therewith I pivot upon the pier support 2 a lever 32 having a bifurcated end 33 in which is journaled a suitable roller. The bolt upon which the lever 32 is pivoted is threaded into the support and by tightening up upon the same, the lever is held in adjusted position.

Passing through the supports are limiting stops 34 which are adapted to be engaged by the hangers so as to hold the wheel into the stream and prevent its rising too far. These limiting stops may be adjusted in any suitable manner so that the limit of the hangers may be arranged higher or lower to suit certain conditions. Such adjustments are common and I therefore have not shown or described any particular one, but may here state that a slot to accommodate the studs may be provided to accomplish this purpose.

In order that repairs may be made to the wheel I form shoulders 40 on the supports and rest thereon a bridge 41 from which is pivotally suspended an apron 42. This apron tapers inwardly on its edges so that when engaged with the water and thrown rearwardly, it will conform with the tapering sides of the fastenings 4. In high water this apron directs the water to the underneath portion of the wheel and makes a more forceful stream to act thereupon.

The wheel is so constructed of the separate flanges and the lateral webs as to form trough-shaped buckets for the water to enter and while I have shown this form of wheel as the simplest one to illustrate, it must be clearly understood that I contemplate other types as within the scope of the invention.

I wish it further understood that I am aware of other ways of suspending the water wheel and of balancing and adjusting its fittings and contemplate such modifications and consider them within the scope and purview of the appended claims.

Having thus described the invention, what is claimed is—

1. In a water wheel, a pair of supports, a pair of hangers adjustably and pivotally mounted therein, a wheel journaled in the hangers, and a pair of guard plates carried by the supports and adapted to overhang the rim of the wheel to guide the water directly thereto.

2. In a water wheel, a pair of supports, separated towers extending upward therefrom, bearing guides arranged on said towers, bearings slidably mounted in said guides, a driven shaft revolubly mounted in said bearings, a pair of hangers pivotally carried on said driven shaft, and a water wheel carried in the hangers.

3. In a water wheel, the combination with a pair of supports, of separated towers rising therefrom, bearing guides mounted thereon bearings adjustably mounted in said guides, a driven shaft mounted in said bearings, wheel supporting means pivotally mounted upon said shaft, and a buoyant wheel journaled in said wheel supporting means, and having connection with said driven shaft.

4. In a water wheel, a pair of supports, wheel supporting hangers pivotally mounted in said supports, a buoyant water wheel journaled therein, a refuse guard carried by the hangers and adapted to move therewith for deflecting refuse beneath the wheel, and means carried by the wheel for forcing the refuse beneath the wheel.

5. In a water wheel, the combination with a support, of a buoyant wheel pivotally mounted on the support, a bridge on the support, and an apron pivotally depending from the bridge and adapted to direct the water to the wheel.

In testimony whereof I affix my signature in presence of two witnesses.

PHILANDER T. DODSON.

Witnesses:
 FRANK E. MORTON,
 LEILA DODSON.

---

Copies of this patent may be obtained for five cents each, by addressing the "Commissioner of Patents, Washington, D. C."